(12) United States Patent
Martinson

(10) Patent No.: US 8,387,216 B1
(45) Date of Patent: Mar. 5, 2013

(54) TIE WRAP FOR BUNDLING OBJECTS

(75) Inventor: Daniel J. Martinson, Plymouth, MN (US)

(73) Assignee: Nite Ize, Inc., Boulder, CO (US)

( * ) Notice: Subject to any disclaimer, the term of this patent is extended or adjusted under 35 U.S.C. 154(b) by 1044 days.

(21) Appl. No.: 12/247,523

(22) Filed: Oct. 8, 2008

(51) Int. Cl.
*B65D 63/02* (2006.01)
*B65D 63/04* (2006.01)

(52) U.S. Cl. .................. 24/30.5 T; 24/16 R; 24/16 PB

(58) Field of Classification Search ............... 24/16 PB, 24/17 AP, 30.5 P, 30.5 S, 300, 301, 302, 339, 24/DIG. 16, 16 R, 30.5 T, 27, 3.5 T, 3.5 R, 24/3.5 P, 3.5 L, 3.5 W, 17, 30.5, 30.5 W, 30.5 R, 24/143 R, 305 T, 305 R, 389, 400, 403, 405; 428/156, 99, 15, 16, 16 R, 17, 30.5 R, 30.5 W, 428/40.9, 114, 167, 172, 192, 308.4, 316.6, 428/318.6, 319.3, 319.7, 319.9, 335, 364, 428/372, 373, 375, 378, 379, 383, 397, 398, 428/399
See application file for complete search history.

(56) References Cited

U.S. PATENT DOCUMENTS

| | | | |
|---|---|---|---|
| 2,118,875 A | 5/1938 | Windheim | |
| 2,530,695 A | 11/1950 | Helmert | |
| 2,542,601 A | 2/1951 | Van Cleef | |
| 3,257,054 A | 6/1966 | Miesel | |
| 3,426,393 A | 2/1969 | Mead | |
| 3,543,353 A | 12/1970 | Meehan | |
| 3,564,667 A | 2/1971 | Parrick, III et al. | |
| 3,757,429 A | 9/1973 | Sumino | |
| 3,768,711 A | 10/1973 | Wilkinson | |
| 3,806,358 A * | 4/1974 | Glander et al. | ............... 428/379 |
| 3,947,927 A | 4/1976 | Rosenthal | |
| 3,960,302 A | 6/1976 | Mazzoni | |
| 4,015,762 A | 4/1977 | Mendillo | |
| 4,120,437 A | 10/1978 | Hara | |
| 4,463,885 A | 8/1984 | Ball et al. | |
| 4,483,470 A | 11/1984 | Cousins | |
| 4,484,378 A | 11/1984 | Kimura et al. | |
| 4,488,748 A | 12/1984 | Burkes | |
| 4,531,661 A | 7/1985 | Santy | |
| 4,540,006 A | 9/1985 | Collis | |
| 4,553,779 A | 11/1985 | Shortridge | |
| 4,641,454 A | 2/1987 | Ray et al. | |
| 4,648,414 A | 3/1987 | Fox et al. | |

(Continued)

OTHER PUBLICATIONS

ACOR, ACOR present Volara 4E, Mar. 2, 2008, http://acor.com/volara.htm.*

(Continued)

*Primary Examiner* — Robert J Sandy
*Assistant Examiner* — Louis Mercado
(74) *Attorney, Agent, or Firm* — Patton Boggs LLP

(57) ABSTRACT

A twist tie device having an elongated piece of shape-retaining deformable material. A cover covers the shape-retaining deformable material along the length of the elongated piece. The cover has a bond between the elongated piece and the cover. The bond between the cover and the elongated piece is along the entire interior surface of the cover. An outer cover may be bonded to the cover. The outer cover may have a gripping surface and a non-gripping surface. The gripping surface will provide more grip for the twist tie device when it is wrapped around itself and the gripping surface will provide more grip when it is wrapped around objects. A non-gripping surface being generally smoother than the gripping surface is suitable for containing indicia.

18 Claims, 2 Drawing Sheets

U.S. PATENT DOCUMENTS

| | | | |
|---|---|---|---|
| 4,666,417 A | 5/1987 | Hillman | |
| 4,761,053 A * | 8/1988 | Cogelia et al. | 385/113 |
| 4,817,837 A | 4/1989 | Grover | |
| 4,834,118 A | 5/1989 | Goeller | |
| 4,856,689 A | 8/1989 | Shore | |
| 4,867,478 A * | 9/1989 | Anderson | 280/814 |
| 4,915,996 A | 4/1990 | Curry | |
| D310,909 S | 10/1990 | Bradtl | |
| 5,054,299 A | 10/1991 | Maveety | |
| 5,056,820 A | 10/1991 | Des Prez | |
| 5,104,017 A | 4/1992 | Vandagriff | |
| 5,190,336 A | 3/1993 | Palz | |
| 5,199,135 A | 4/1993 | Gold | |
| 5,234,370 A | 8/1993 | Shapero et al. | |
| 5,437,401 A | 8/1995 | Seltzer | |
| 5,468,036 A | 11/1995 | Brown | |
| 5,498,190 A | 3/1996 | Ganson | |
| 5,590,422 A | 1/1997 | Henderson | |
| 5,664,589 A | 9/1997 | Black | |
| 5,711,143 A * | 1/1998 | Munakata et al. | 57/215 |
| 5,714,211 A | 2/1998 | Zinbarg et al. | |
| 5,769,994 A | 6/1998 | Booz et al. | |
| 5,853,212 A | 12/1998 | Daniel | |
| 5,916,006 A | 6/1999 | Ganson | |
| 6,113,170 A | 9/2000 | Daniel | |
| 6,114,036 A * | 9/2000 | Rinehart et al. | 428/383 |
| 6,206,542 B1 | 3/2001 | Case et al. | |
| 6,237,740 B1 * | 5/2001 | Weatherall et al. | 198/337 |
| 6,332,052 B1 * | 12/2001 | Luther et al. | 385/114 |
| 6,372,344 B1 * | 4/2002 | Castellani et al. | 428/379 |
| 6,848,663 B2 | 2/2005 | Olive | |
| 7,011,879 B1 | 3/2006 | Contreras et al. | |
| 7,123,801 B2 * | 10/2006 | Fitz | 385/105 |
| 7,192,069 B1 * | 3/2007 | Daniel | 294/147 |
| 7,250,213 B2 * | 7/2007 | Duncan | 428/379 |
| 7,377,828 B2 * | 5/2008 | Cheung | 441/74 |
| 2002/0028336 A1 * | 3/2002 | Jaccoud | 428/447 |
| 2005/0093205 A1 * | 5/2005 | Martin et al. | 264/326 |
| 2005/0211357 A1 * | 9/2005 | Ren | 152/450 |
| 2005/0274211 A1 * | 12/2005 | Edgman | 74/63 |
| 2008/0124544 A1 * | 5/2008 | Alexander et al. | 428/364 |
| 2008/0254281 A1 * | 10/2008 | Chen et al. | 428/335 |

OTHER PUBLICATIONS

Web page illustration from web site illustrating GripTwist lock and carry device; griptwist.com; Dakota Trading Corporation, 2008.

Web page illustration from web site illustrating reusable silicone coated Sili Twists; www.wrapables.com•, Wrapables, 2008.

* cited by examiner

TIE WRAP FOR BUNDLING OBJECTS

BACKGROUND OF THE INVENTION

Twist ties are well known in the art and are typically not suitable supporting weight or bundling large objects. Twist ties are often found on packaging such as bread wrappers. These twist ties are usually a plastic or paper coating that covers a wire within the twist tie. The plastic or paper coating is not bonded to the wire and may be easily removed. Also, the coating provides little grip to the object on which the twist tie is wrapped. The coating does not grip itself well either.

U.S. Pat. No. 6,113,170 shows a wrap for bundling objects that includes a wire covered by a flexible tube, but there is no bonding between the wire and the tube. The invention of that patent also lacks a surface which enhances grip of the wrap when it is wrapped around itself or other objects.

SUMMARY OF THE INVENTION

The present invention relates to a twist tie device. The device has an elongated piece of shape-retaining deformable material. A cover covers the shape-retaining deformable material along the length of the elongated piece. The cover has a bond between the elongated piece and the cover. The bond between the cover and the elongated piece is along the entire interior surface of the cover. An outer cover may be bonded to the cover.

The outer cover may have a gripping surface and a non-gripping surface. The gripping surface will provide more grip for the twist tie device when it is wrapped around itself and the gripping surface will provide more grip when it is wrapped around objects. A non-gripping surface being generally smoother than the gripping surface is suitable for containing indicia.

DETAILED DESCRIPTION OF INVENTION

Figure 1:
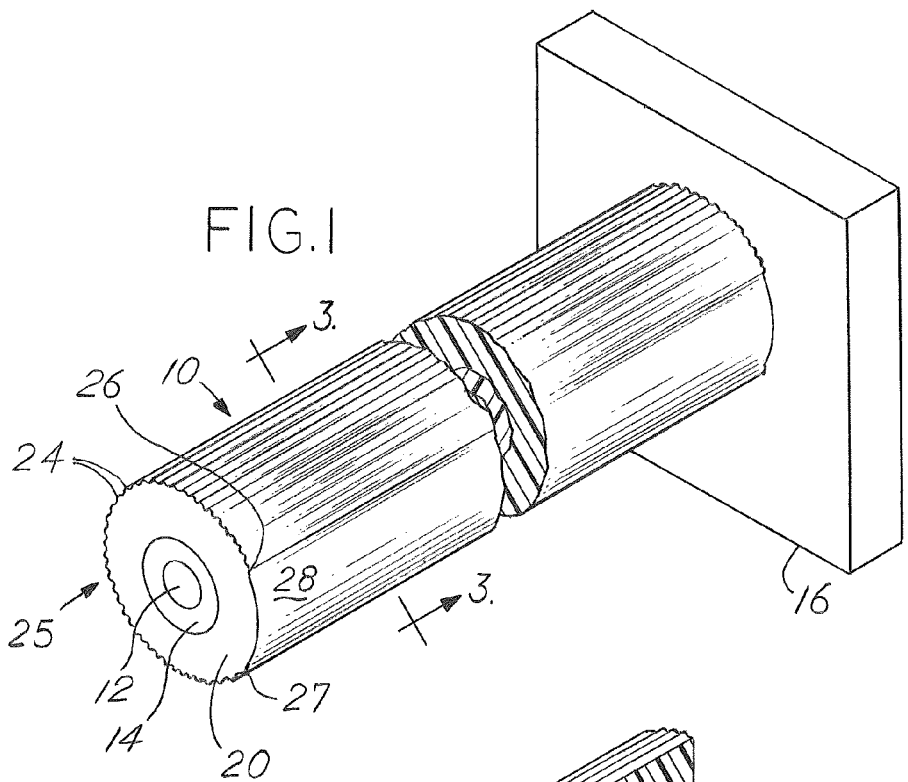
FIG. 1 is a perspective sectional view of the twist tie device.
Figure 2:
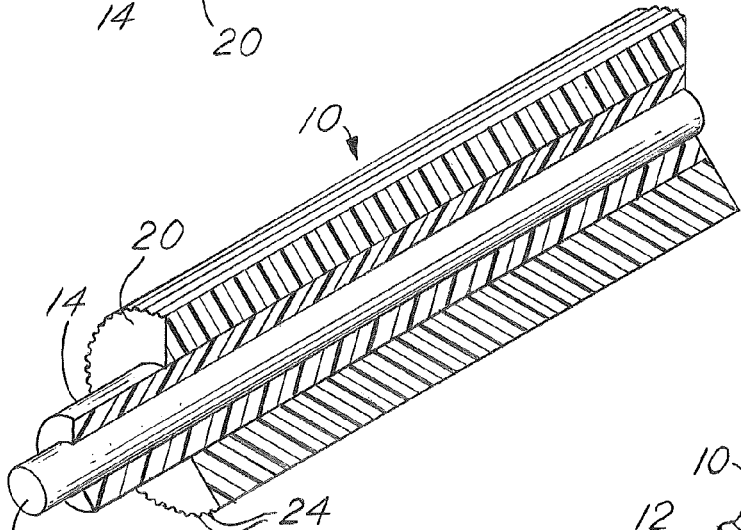
FIG. 2 is a perspective sectional view of the device shown in FIG. 1.

The present invention of a twist tie device 10 includes an elongated piece of shape-retaining deformable material, which is typically a metal wire 12. The wire 12 is typically a mild steel wire. The wire 12 will be flexible enough to be bent or tied into a particular shape necessary to accomplish a task, but still rigid enough to retain a shape into which it is bent. The diameter of the wire 12 also affects flexibility and shape retention. A diameter 0.62 provides both flexibility and necessary shape retention; however, other diameters may be used depending on the application for which the twist tie device 10 will be used. A cover 14 is bonded to the wire 12 along its entire length. The cover is formed by coextruding the wire 12 through an extrusion head 16 along with a polymer. The wire 12 is first heated to approximately 300-400 degrees Fahrenheit and then drawn through the extrusion head 16. As the wire 12 moves through the extrusion head 16 a layer of liquid polymer is deposited evenly around the wire 12 to form the cover 14. During this process, the polymer forming the cover 14 is cured so that it adheres to the wire 12. This forms a bond around the entire perimeter of the wire 12 and along the entire length of the wire 12. The bond prevents the wire 12 from slipping out of the cover 14. The polymer used to make the cover 14 is typically a solid thermoplastic polymer, such as 85A Duro EXXON SANTOPRENE® 8291-85TL, or a similar type of polymer. EXXON SANTOPRENE® is particularly well suited as a cover 14 material because it is formulated to bond to metal. The durometer of the EXXON SANTOPRENE® cover 14 is 85A, which is fairly tough yet flexible. An advantage of using a solid polymer such as Santoprene is that it is resilient and will resist taking a compression set when it is compressed for an extended amount of time.

Figure 3:
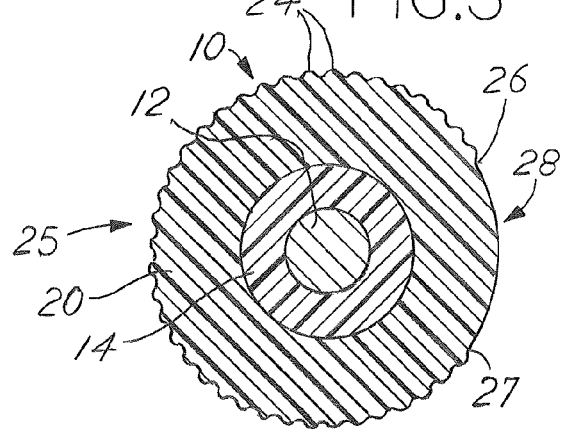
FIG. 3 is a sectional view taken about the line 3-3 in FIG. 1.

An outer cover 20 can be coextruded over the cover. This outer cover 20 is typically a different material than the cover 14. The material of the outer cover 20 is typically softer and of a lower durometer. A suitable material for the outer cover 20 is 15A Duro Teknor Apex Uniprene® UN-2005 TPV. This is a solid thermoplastic polymer. The lower durometer of the outer cover 20 provides a high friction surface. The generally high friction of the outer cover 20 may be increased further by extruding ribs 24 into the outer surface as shown in FIG. 3 to define a texturized gripping surface 25. The gripping surface 25 extends between points 26 and 27 on the left side of the twist tie device 10 as shown in FIG. 3. The gripping surface 25 is well suited to provide a strong grip when the twist tie device 10 is wrapped around itself, and provides friction when the device is wrapped around objects. The texturized gripping surface 25 may have other embossed patterns that provide a texturized surface; however, ribs 24 are well suited to the extrusion process by which the twist tie device 10 is made. A non-gripping surface 28 extends between points 26 and 27 on the right side of the twist tie device 10 as shown in FIG. 3. The non-gripping surface 28 is characterized by a smoother texture than the gripping surface 25. Indicia, such as logos or other labels, may be place on the non-gripping surface 28 and will be easier to read than if placed on the gripping surface 25.

The cover 14 and outer cover 20 are bonded tightly so that no water may enter between the wire 12 and either cover 14, 20. However, the ends of the wire 12 are not protected by either cover 14, 20. The ends of the wire may be coated with a protective paint or clear coat to prevent corrosion of the ends of the wire 12, but this is not necessary.

Figure 4:
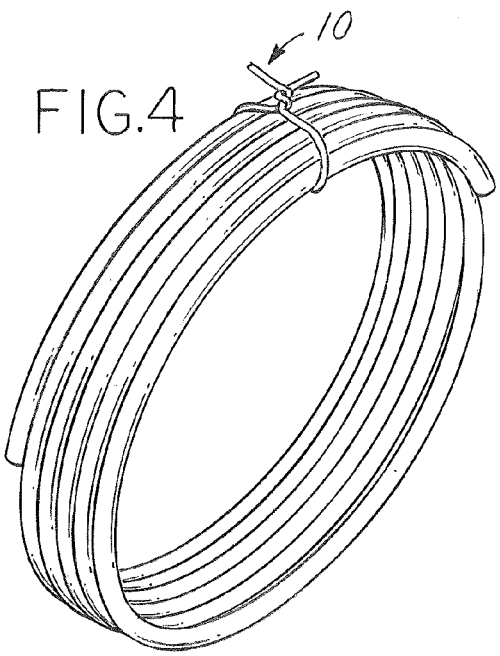
FIGS. 4-6 show the twist tie device used to bundle articles.
Figure 5:
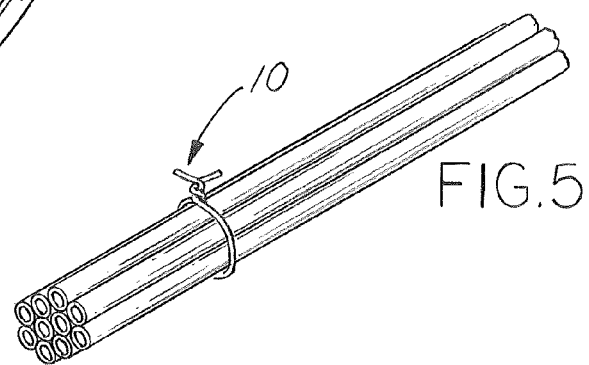
Figure 6:
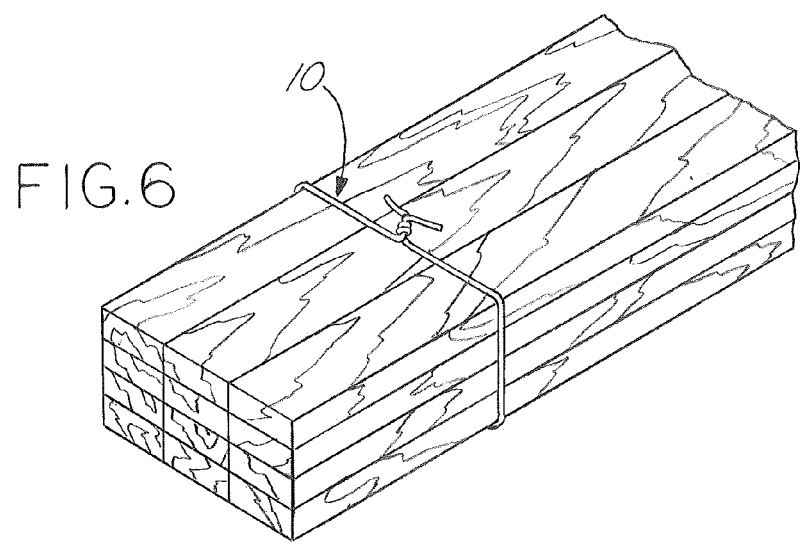

The twist tie 10 may be used by beginning with the tie wrap 10 in a generally straightened position. Articles to be bundled can be gathered into manageable bundles as shown in FIGS. 4-6. The twist tie 10 may be wrapped around each bundle of articles then twisted to form loops around each bundle. The outer cover 20 will provide a high friction gripping surface that will prevent articles contacting the tie wrap 10 from sliding out of the tie wrap 10. The soft outer cover 20 will not scratch surfaces of articles within the tie wrap 10. The tie wrap 10 can be left in its twisted position around bundled articles for as long as necessary. The resilient cover 14 and outer cover 20 will resist taking a permanent set due to being compressed due to twisting the twist tie 10 together, or compression due to pressure exerted on the articles within the twist tie 10. Due to the durable construction of the twist tie 10 it may be used effectively in temperatures from −50 degrees F. to 200 degrees F. Additionally, the covers 14, 20 will prevent the twist tie device 10 from breaking if the wire 12 were to break because the bond between the cover 14 and the wire 12 will prevent the wire 12 from exiting the covers 14, 20.

The invention is not limited to the details given above, but may be modified within the scope of the following claims.

What is claimed is:
1. A twist tie device comprising:
an elongated piece of shape-retaining deformable material;

a cover covering said shape-retaining deformable material along a length of said elongated piece, said cover and said shape-retaining deformable material being bonded along their length; and an outer cover covering the cover, the outer cover bonded to the cover, wherein said cover has an interior surface, said cover being bonded to said elongated piece of shape-retaining deformable material along the entire interior surface of said cover, wherein said cover has a durometer of greater than 50A and the outer cover has a durometer of less than 50A.

2. A twist tie device as claimed in claim 1, wherein said deformable material is metal.

3. A twist tie device as claimed in claim 1, wherein said outer cover has ribs.

4. The twist tie device of claim 3, wherein the outer cover provides a high friction gripping surface for gripping objects or gripping said twist tie device when said device is twisted together.

5. A twist tie device as claimed in claim 1, wherein said cover and outer cover are thermoplastic polymers.

6. A twist tie device as claimed in claim 1, wherein said outer cover is composed of a softer material than said cover.

7. A twist tie device as claimed in claim 1, having a gripping surface for gripping objects or gripping said twist tie device when said device is twisted together and a non-gripping surface being generally smoother than said gripping surface, said non-gripping surface for containing indicia.

8. A twist tie device as claimed in claim 7, wherein said gripping surface includes outwardly extending ribs.

9. A twist tie device as claimed in claim 1, wherein said outer cover has an interior surface, said outer cover is bonded to said cover along the entire interior surface of said outer cover.

10. A twist tie device as claimed in claim 9, wherein said outer cover and an inner cover are a thermoplastic elastomer.

11. A twist tie device as claimed in claim 9, wherein a gripping surface includes outwardly extending ribs.

12. A twist tie device as claimed in claim 1, wherein said outer cover is bonded with a watertight bond to said cover.

13. A twist tie device as claimed in claim 12, wherein said cover is a solid polymer.

14. A twist tie device as claimed in claim 1, wherein said cover has a durometer of approximately 85A and the outer cover has a durometer of approximately 15A.

15. A twist tie device comprising:
an elongated piece of shape-retaining deformable material;
a cover covering said shape-retaining deformable material along a length of said elongated piece, said cover and said shape-retaining deformable material being bonded along their length; and
an outer cover covering the cover, the outer cover bonded to the cover, wherein said cover has an interior surface, said cover being bonded to said elongated piece of shape-retaining deformable material along the entire interior surface of said cover, wherein said cover has a durometer of greater than 50A and the outer cover has a durometer of less than 50A.

16. The twist tie device of claim 15, wherein the durometer of the cover is not so great as to inhibit the wrapping and holding of the twist tie device around an object.

17. A twist tie device comprising:
an elongated piece of shape-retaining deformable material;
a cover covering said shape-retaining deformable material along a length of said elongated piece, said cover and said shape-retaining deformable material being bonded along their length; and
an outer cover covering the cover, the outer cover bonded to the cover, wherein said cover has an interior surface, said cover being bonded to said elongated piece of shape-retaining deformable material along the entire interior surface of said cover, wherein said cover has a durometer of greater than 50A and the outer cover has a durometer of less than 40A.

18. A method of making a twist tie device comprising:
providing an elongated piece of shape-retaining deformable material;
heating said shape-retaining deformable material; and
coextruding a cover to surround said elongated piece of shape-retaining deformable material so that a bond is formed between said shape-retaining deformable material and said cover, wherein coextruding includes drawing the elongated piece of shape-retaining deformable material through an extrusion head.

\* \* \* \* \*